United States Patent [19]

Benhase et al.

[11] Patent Number: 5,463,752
[45] Date of Patent: Oct. 31, 1995

[54] METHOD AND SYSTEM FOR ENHANCING THE EFFICIENCY OF COMMUNICATION BETWEEN MULTIPLE DIRECT ACCESS STORAGE DEVICES AND A STORAGE SYSTEM CONTROLLER

[75] Inventors: Michael T. Benhase; Brent C. Beardsley; William G. Sherman, II; Adalberto G. Yanes, all of Tucson, Ariz.

[73] Assignee: International Business Machines Corporation, Armonk, N.Y.

[21] Appl. No.: 949,670

[22] Filed: Sep. 23, 1992

[51] Int. Cl.⁶ .................... G06F 13/00; G06F 13/22; G06F 13/24
[52] U.S. Cl. .................. 395/481; 364/214.1; 364/242.1; 364/940.5; 364/DIG. 1; 364/DIG. 2; 364/230.2; 395/700; 395/735; 395/867
[58] Field of Search ............ 395/425; 364/200 MS File, 364/900 MS File, 241.1, 241–241.2, 941, 940.1, 940.5, 940.6, 242.1

[56] References Cited

U.S. PATENT DOCUMENTS

| | | | |
|---|---|---|---|
| 3,815,105 | 6/1974 | Adkins et al. | 340/172.5 |
| 4,038,642 | 7/1977 | Bouknecht et al. | 364/900 |
| 4,465,738 | 8/1984 | Hansen et al. | 395/325 |
| 4,631,670 | 12/1986 | Bradley et al. | 395/725 |
| 4,638,428 | 1/1987 | Gemma et al. | 364/200 |
| 4,638,452 | 1/1987 | Schultz et al. | 395/550 |
| 4,654,820 | 3/1987 | Brahm et al. | 395/325 |
| 4,667,193 | 5/1987 | Cotie et al. | 340/825 |
| 4,701,845 | 10/1987 | Andreasen et al. | 364/200 |
| 4,839,640 | 6/1989 | Ozer et al. | 340/825.31 |
| 4,882,730 | 11/1989 | Shinmyo | 370/95.2 |
| 4,924,461 | 5/1990 | Amemiya et al. | 370/95.2 |
| 4,933,846 | 6/1990 | Humphrey et al. | 395/325 |
| 4,942,572 | 7/1990 | Picard | 370/85.8 |
| 4,972,368 | 11/1990 | O'Brien et al. | 395/275 |
| 5,010,329 | 4/1991 | Nagakura | 340/825.080 |
| 5,155,839 | 10/1992 | Weppler | 395/500 |
| 5,201,053 | 4/1993 | Benhase et al. | 395/725 |

*Primary Examiner*—David L. Robertson
*Assistant Examiner*—Frank J. Asta
*Attorney, Agent, or Firm*—H. St. Julian; L. Bruce Terry; Andrew J. Dillon

[57] ABSTRACT

A method and system for enhancing the efficiency of communication between multiple direct access storage devices and a storage system controller in a data processing system. In a data processing system having a storage system controller connected between a plurality of host computers and a plurality of storage devices, a processors, within the storage system controller, is provided for controlling the storage devices. Commands and data are communicated between the processor and the storage devices over a communication channel. An independent polling mechanism is provided which is coupled to the communication channel and the processor. The independent polling mechanism is utilized for collecting and storing interrupt status data from each of the storage devices. An interrupt circuit coupled to the independent polling mechanism is then utilized to produce an interrupt signal at the processor, in response to the state of the interrupt status data collected from the storage devices, wherein the polling of the storage devices by the processor is not required. By utilizing an independent polling mechanism the manner in which the storage devices are polled may be selectively controlled such that only selected storage devices are polled, only selected interrupt status conditions are recognized, or periodic interrupt signals are generated regardless of the status of the storage devices.

7 Claims, 3 Drawing Sheets

METHOD AND SYSTEM FOR ENHANCING THE EFFICIENCY OF COMMUNICATION BETWEEN MULTIPLE DIRECT ACCESS STORAGE DEVICES AND A STORAGE SYSTEM CONTROLLER

BACKGROUND OF THE INVENTION

1. Technical Field

The present invention relates in general to storage system controllers for data processing systems, and more particularly to a method and system for managing communication between a storage system controller and a plurality of direct access storage devices. Still more particularly, the present invention relates to a method and system for reducing the amount of storage path processor time consumed by polling direct access storage devices for interrupt status data.

2. Description of the Related Art

In large data processing systems, it is common to utilize specialized hardware and software to control input/output devices. An example of one such specialized device is the "3990 Model 3 Storage Control" available from International Business Machines Corporation. The 3990 is a storage system controller which, in part, off-loads host-processor workload by receiving input/output commands from the host computer system, translates these commands to the Direct Access Storage Device (DASD), and manages the transfer of data between the host computer and the DASD. In performing these functions, the storage system controller transmits commands and data to a plurality of DASDs, each connected to the storage system controller via multiple communication links.

Typically, the communication links utilized to connect the storage system controller to the DASDs are a high speed parallel communications links. One example of such a communications link is the "Director to Device Connection" (DDC) interface, available from International Business Machines Corporation. The DDC consists of 24 differential signal lines and is designed to meet the objectives of high data transfer rate on a two-byte wide bus over a maximum external cable length of 61 meters (200 feet).

A storage path processor within the storage system controller sends a command to a particular DASD via the DDC. After the command is sent, the storage path processor must repeatedly poll or request interrupt status data from the particular DASD to determine whether or not the DASD is finished with the previous command and is ready to transfer data or execute the next command. Within the storage system controller, such a polling function may utilize up to twenty percent of the storage path processor's processing time.

Such a high percentage of processing time is consumed by the polling function for three reasons. First, because the disk in the DASD continuously rotates, the DASD interrupt status data is valid only for a specified period of time while the angular position of the platter is located within a specified angular range. To ensure the DASD's interrupt status data is read while it is valid, the DASDs must be polled within a specified maximum period of time. If the time between successive readings of interrupt status data from a particular DASD exceeds a maximum time period, valid interrupt status data may be missed. Second, since the DASD does not immediately respond to a request for interrupt status data when requested by the storage path processor, the storage path processor must wait idly for a response from the polled DASD. Such idle time consumes time that might otherwise be utilized to manage other overhead tasks. And third, because often the storage path processor does not have enough time to poll every connected DASD within the maximum time interrupt status data is valid, polling may be divided into two parts: a summary poll and a substring poll. The summary poll returns composite interrupt status data (each interrupt status data bit represents the status of more than one DASD) to the storage path processor. This requires the storage path processor to execute two poll requests to determine which particular DASD has interrupt status data indicating that the previous operation is complete. The first poll, which is a summary poll, may return interrupt status data indicating that a DASD within a group of DASDs has completed a command. A second poll is then required to determine which particular DASD within the group is indicating a "command complete" status.

In known storage system controllers having a parallel communication link for communicating with multiple DASDs, the storage path processor within the storage system controller performs the polling function to collect interrupt status data representing the status of each associated DASD. In order to avoid missing a change in interrupt status data within any storage device, the path processor must complete the entire polling cycle (request interrupt status data from each DASD) within a specific maximum window of time while the storage device interrupt status data is valid. Since this window of time is often not large enough for the storage path processor to individually poll every associated DASD, the storage path processor must utilize a summary poll and a substring poll. Consequently, a high percentage of processor time is consumed polling for interrupt status data from the connected DASDs. Thus it should be obvious to one skilled in the art that a need exists for a method and system to independently perform the polling function and thereby relieve the storage path processor from a task that may consume up to twenty percent of the available processing time.

SUMMARY OF THE INVENTION

It is therefore one object of the present invention to provide enhanced efficiency of communication between a plurality of direct access storage devices and a storage system controller.

It is another object of the present invention to provide a method and system for enhancing the efficiency of a storage path processor within a storage system controller by eliminating the time consuming function of storage device polling by the storage path processor.

It is yet another object of the present invention to provide a method and system for independently polling direct access storage devices for interrupt status data and interrupting the processor in response to predetermined conditions of the interrupt status data.

The foregoing objects are achieved as is now described. A method and system are disclosed for enhancing the efficiency of communication between multiple direct access storage devices and a storage system controller in a data processing system. In a data processing system having a storage system controller connected between a plurality of host computers and a plurality of storage devices, a processor, within the storage system controller, is provided for controlling the storage devices. Commands and data are communicated between the processor and the storage devices over a communication channel. An independent polling mechanism is provided which is coupled to the communication channel and the processor. The independent polling mechanism is utilized for collecting and storing interrupt status data from each of the storage devices. An interrupt circuit coupled to the independent polling mechanism is then utilized to produce an interrupt signal at the processor, in response to the state of the interrupt status data collected from the storage devices, wherein the polling of the storage devices by the processor is not required. By utilizing an independent polling mechanism the manner in which the storage devices are polled may be selectively controlled such that only selected storage devices are polled, only selected interrupt status conditions are recognized, or periodic interrupt signals are generated regardless of the status of the storage devices.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
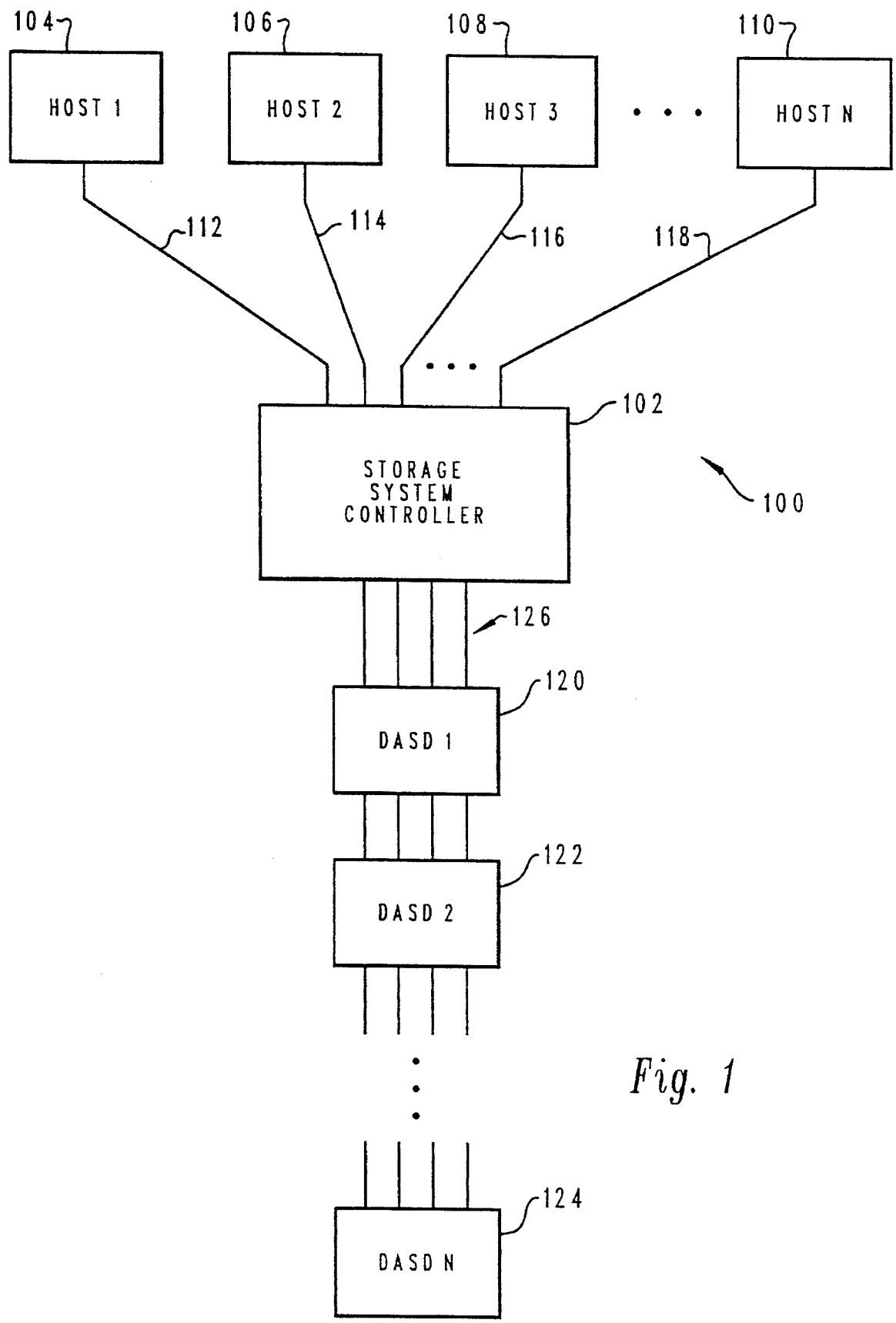
FIG. 1 accordance with a preferred embodiment of the present invention a high level block diagram of a data processing system which may be utilized to implement the method and system of the present invention.

With reference now to the figures and in particular with reference to FIG. 1, there is depicted a high level block diagram of a data processing system 100. Data processing system 100 includes a storage system controller 102. One example of such a storage system controller is the "3990 Model 3 Storage Control" available from International Business Machines Corporation. Storage system controller 102 is connected to host computers 104, 106, 108 and 110. Although only four host computers are depicted, data processing system 100 may include additional host computers. Host computers 104–110 are connected to storage system controller 102 by data channels 112, 114, 116 and 118. Data channels 112–118 may be optical serial channels capable of transmitting data over distances of 15 kilometers and longer. One example of such an optical serial channel is "IBM Enterprise Systems Connection" (ESCON) available from International Business Machines Corporation. Storage system controller 102 is also connected to direct access storage devices 120, 122 and 124. Although only three direct access storage devices are depicted, 128 direct access storage devices may be included in data processing system 100. Storage system controller 102 provides a common interconnection 126 between storage system controller 102 and each direct access storage device 120–124.

Figure 2:
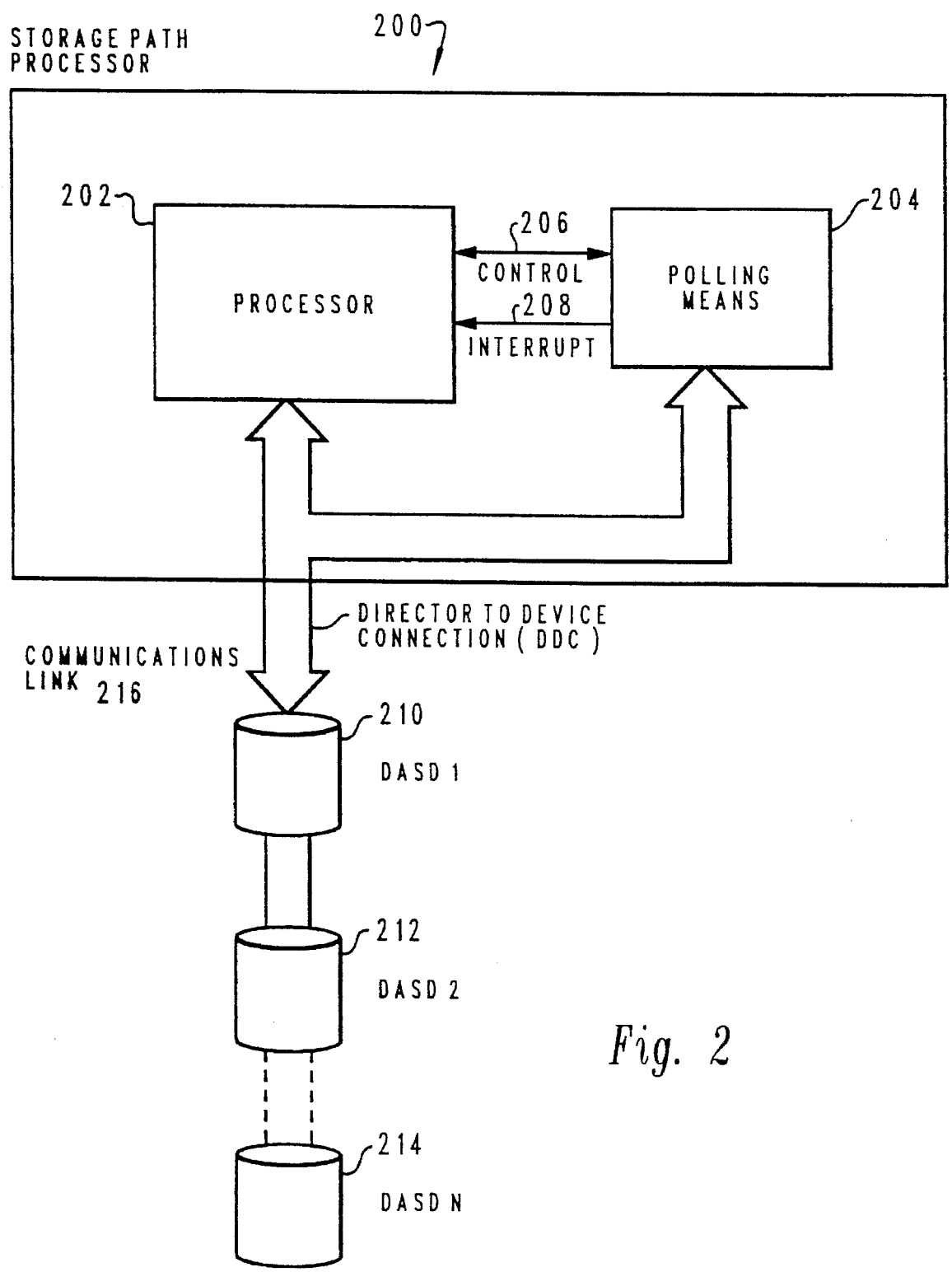
FIG. 2 is a high level block diagram further illustrating the storage system controller of FIG. 1.

FIG. 2 illustrates a high level block diagram of one of four storage path processors within storage system controller 102 shown in FIG. 1. Storage system controller 102 is preferably an IBM 3990 Model 3 type storage system controller, which is available from International Business Machines Corporation. Storage system controller 102 has two storage clusters (not shown) which mirror one another in terms of functional features (although not in operations). Each storage cluster (not shown) has two storage path processors which mirror one another in terms of functional features (although not in operations). One such storage path processor is shown in FIG. 2. Storage path processor 200 comprises processor 202 coupled to independent polling means 204. Processor 200 controls independent polling means 204 by reading and writing control words within independent polling means 204 utilizing control lines 206. Independent polling means 204 interrupts processor 202 utilizing interrupt line 208. Processor 202 communicates with connected direct access storage devices (DASDs) 210, 212 and 214 utilizing communications link 216. Communications link 216 is preferably a Director to Device Connection (DDC), available from International Business Machines Corporation. Although only three DASDs 210, 212 and 214 are shown, sixty-four DASDs may be connected to the same communications link 216.

Although no detailed circuit description of the independent polling device is shown, those skilled in the art will recognize that the independent polling function may be implemented in several ways, depending upon the particular architecture of the systems utilized. For example, the independent polling function may be implemented with a separate microprocessor, with a state machine having status and control registers, or with an independent microcode module within a general microprocessor.

Figure 3:
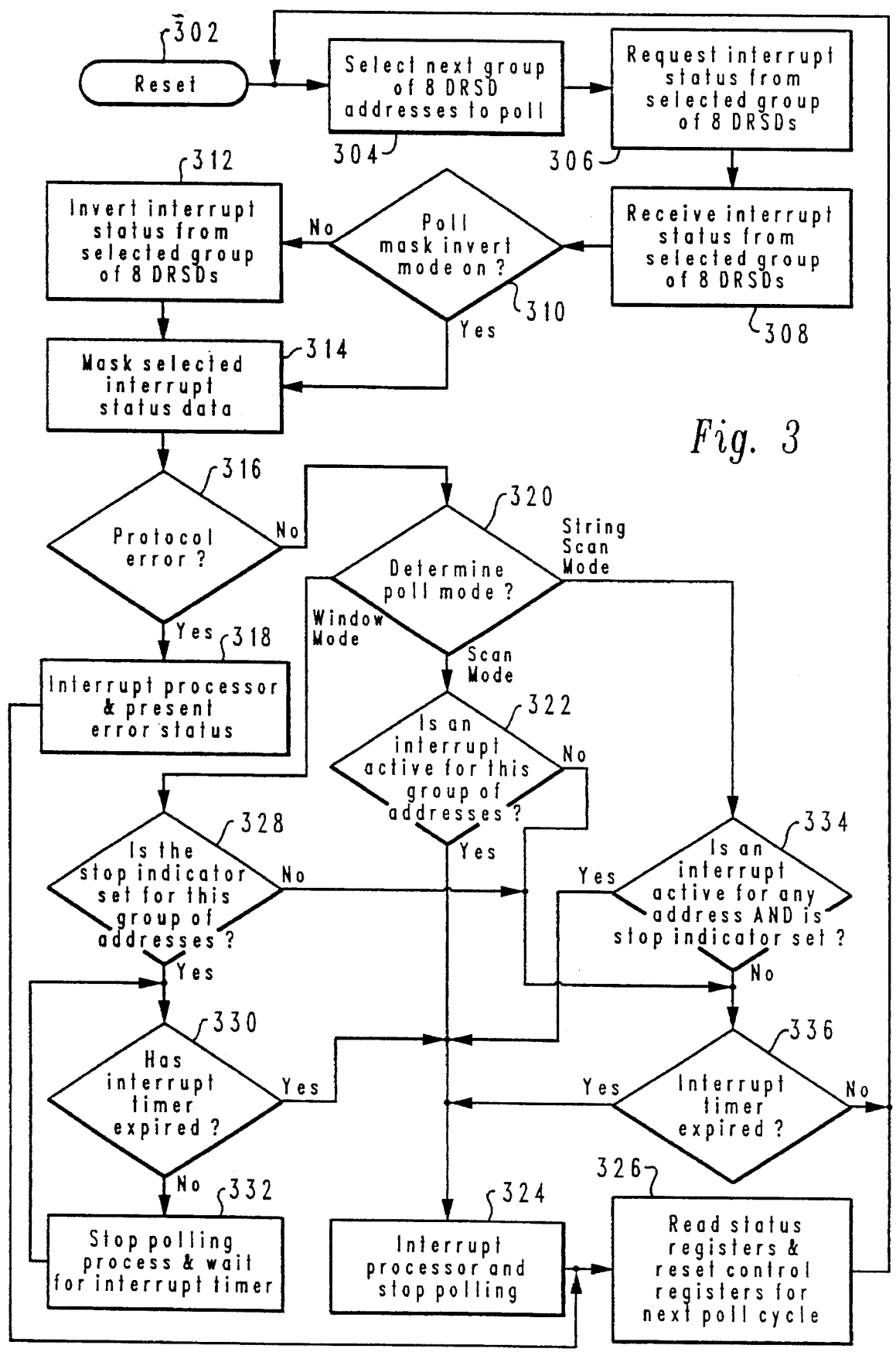
FIG. 3 is a logical flowchart depicting a programmed response of the storage system controller programmed according to the present invention.

Finally, with reference to FIG. 3, there is depicted a high level logical flowchart for implementing the system and method of the invention as executed within independent polling means 204 of FIG. 2. Terminal block 302 depicts the entry point at which normal process flow begins after power up. The process begins, as illustrated at block 304, by selecting a next group of eight DASD addresses to poll. Next, the process requests interrupt status data from the newly selected group of eight DASDs, as illustrated at block 306. Next, the process receives interrupt status from the selected group of eight DASDs, as depicted at block 308. Both the request for interrupt status data illustrated in block 306 and the receipt of interrupt status data illustrated in block 308 utilize communications link 216 to transmit control signals, addresses and interrupt status data between independent polling means 204 and DASDS 210, 212 and 214.

Once interrupt status data is received by independent polling means 204, the interrupt status data is inverted if poll mask invert mode is on, as illustrated at decision block 310 and process block 312. Invert mode enables the independent polling means 204 to generate an interrupt signal in response to a bit within the interrupt status data changing from a "1" to a "0". Such a change in interrupt status data is an indication that the particular DASD is no longer requesting service from processor 202. One example of when a DASD may no longer request service is after the DASD has completed a command to find a particular sector on the disk and the disk has rotated past that particular sector before processor 202 could respond to either read or write new data to that sector. Then, as depicted at block 314, selected interrupt status data is masked with a data word stored in a buffer mask register. Also, as depicted at decision block 316, the process determines whether or not a protocol error has occurred. If a protocol error has occurred, the process interrupts processor 202 and presents the appropriate error status for processor 202 to read from an appropriate status register, as illustrated at block 318. After interrupting processor 202, the process presents status to processor 202 and resets control registers to prepare for the next poll cycle, as depicted at block 326. The next poll cycle begins by selecting the next group of eight DASD addresses to poll, as illustrated at block 304.

If the process does not detect a protocol error, the process then determines what poll mode has been requested by processor 202, as depicted at decision block 320. Three poll modes may be selected by processor 202. These are "window" mode, "scan" mode and "string scan" mode. In window mode operation, the process first determines whether or not a stop indicator is set for the current group of eight DASDs addressed, as depicted at decision block 328. If the stop indicator is set, the process waits for an interrupt timer to expire, as illustrated at decision block 330 and process block 332. After the interrupt timer has expired, independent polling means 204 interrupts processor 202 and stops independent polling, as illustrated at block 324. Then, as depicted at block 326, processor 202 reads the status registers and the process resets control registers in preparation for the next poll cycle. The next poll cycle begins by selecting the next group of eight DASD addresses to poll, as illustrated at block 304.

In scan mode, the process examines the interrupt status data after it has been modified as depicted at blocks 310, 312 and 314. If the modified interrupt status data contains any bit set to "1", an active interrupt exists. If the process finds an active interrupt within the most recently polled group of eight DASDs, as illustrated at decision block 322, independent polling means 204 interrupts processor 202 and stops independent polling, as depicted at block 324. If no active interrupt is found in the present group of DASDs, the process determines whether or not the interrupt timer has expired, as illustrated at decision block 336. If the interrupt timer has expired, independent polling means 204 interrupts processor 202 and independent polling is stopped, as illustrated at block 324. If the interrupt timer has not expired, the process selects the next group of eight DASD addresses to poll, as depicted at block 304, and the next poll cycle continues.

In string scan mode, the process determines whether or not an active interrupt is found within any group of eight DASDs addressed, and coincidentally the stop indicator is set, as illustrated at decision block 334. If the interrupt is found, and the stop indicator is set, independent polling means 204 interrupts processor 202 and independent polling stops, as depicted at block 324. If an interrupt is not found or the stop indicator is not set, the process determines whether or not the interrupt timer has expired, as illustrated at decision block 336. If the interrupt timer has expired, independent polling means 204 interrupts processor 202 and independent polling stops, as depicted at block 324. If the interrupt timer has not expired, the process selects the next group of eight DASD addresses to poll, as illustrated at block 304.

While the invention has been particularly shown and described with reference to a preferred embodiment, it will be understood by those skilled in the art that various changes in form and detail may be made therein without departing from the spirit and scope of the invention.

What is claimed is:

1. A data processing system having a storage system controller connected between a plurality of host computers and a plurality of storage devices, said storage system controller comprising:

processor means for controlling said plurality of storage devices;

communication means for communicating commands and data between said processor means and said plurality of storage devices;

independent polling means coupled to said communication means and said processor means for requesting interrupt status data and storing said interrupt status data from each of said plurality of storage devices., wherein said independent polling means and said processor means are coupled to the same communication means coupled to said plurality of storage devices, and wherein said independent polling means is operable in multiple modes, and wherein said processor means further includes mode control means for controlling a mode of operation of said independent polling means; and interrupt means coupled to said independent polling means and said processor means for producing an interrupt signal at said processor means in response to the state of said interrupt status data from said plurality of storage devices wherein polling said storage devices for said interrupt status data by said processor means is not required.

2. A data processing system having a storage system controller connected between a plurality of host computers and a plurality of storage devices according to claim 1 wherein said independent polling means further includes an interrupt status data mask for blocking selected interrupt status data which will otherwise cause said interrupt means to produce said interrupt signal.

3. A data processing system having a storage system controller connected between a plurality of host computers and a plurality of storage devices according to claim 1 wherein said independent polling means further includes means for controlling said interrupt means such that said interrupt means interrupts said processor means only in response to a change in said interrupt status data from a previous condition of said interrupt status data.

4. A data processing system having a storage system controller connected between a plurality of host computers and a plurality of storage devices according to claim 1 wherein said independent polling means further includes a scan mode wherein a portion of said plurality of storage devices to be polled is defined and wherein said interrupt means produces said interrupt signal in response to said interrupt status data only within said portion of said plurality of said storage devices.

5. A data processing system having a storage system controller connected between a plurality of host computers and a plurality of storage devices according to claim 1 wherein said independent polling means further includes a window mode wherein a range of said plurality of said storage devices to be polled is defined and wherein said interrupt means produces said interrupt signal in response to independently polling a last storage device within said range of said storage devices and upon an expiration of a selected period of time, as determined by an interrupt timer.

6. A data processing system having a storage system controller connected between a plurality of host computers and a plurality of storage devices according to claim 1 wherein said independent polling means further includes a string scan mode wherein said interrupt means produces said interrupt signal upon finding a specified condition of said interrupt status data or upon an expiration of a selected period of time, as determined by an interrupt timer.

7. A method in a data processing system having a storage system controller connected between a plurality of host computers and a plurality of storage devices via communication means, wherein said storage system controller includes processor means for controlling said plurality of storage devices and independent polling means, which is coupled to said processor means and said communication means, for requesting and storing interrupt status data, said method comprising the steps of:

controlling said plurality of storage devices utilizing said processor means;

communicating commands and data between said processor means and said plurality of storage devices via said communication means;

utilizing said polling means, independently polling said plurality of storage devices via said communication means to collect and store interrupt status data; and producing an interrupt signal in response to said interrupt status data and coupling said interrupt signal to said processor means, wherein polling said storage devices for said interrupt status data by said processor is not required.

* * * * *

UNITED STATES PATENT AND TRADEMARK OFFICE
CERTIFICATE OF CORRECTION

PATENT NO.   : 5,463,752
DATED        : October 31, 1995
INVENTOR(S)  : Benhase et al.

It is certified that error appears in the above-indentified patent and that said Letters Patent is hereby corrected as shown below:

In column 3, line 29, after "1" and before "accordance," please insert -- depicts in--.

Signed and Sealed this

Sixteenth Day of April, 1996

*Attest:*

BRUCE LEHMAN

*Attesting Officer*        *Commissioner of Patents and Trademarks*